(12) United States Patent
Valente et al.

(10) Patent No.: US 9,711,117 B2
(45) Date of Patent: Jul. 18, 2017

(54) METHOD AND APPARATUS FOR RECOGNISING MUSIC SYMBOLS

(71) Applicant: MYSCRIPT, Nantes (FR)

(72) Inventors: Fabio Valente, Nantes (FR); Pierre-Michel Lallican, Petit-Mars (FR)

(73) Assignee: MYSCRIPT, Nantes (FR)

( * ) Notice: Subject to any disclaimer, the term of this patent is extended or adjusted under 35 U.S.C. 154(b) by 0 days.

(21) Appl. No.: 15/209,026

(22) Filed: Jul. 13, 2016

(65) Prior Publication Data
US 2016/0322038 A1    Nov. 3, 2016

Related U.S. Application Data

(63) Continuation of application No. 14/176,800, filed on Feb. 10, 2014, now Pat. No. 9,424,823.

(51) Int. Cl.
*G10H 1/00* (2006.01)
*G10G 1/00* (2006.01)
(Continued)

(52) U.S. Cl.
CPC .......... *G10G 1/00* (2013.01); *G06F 3/03545* (2013.01); *G06F 3/041* (2013.01); *G06K 9/00* (2013.01);
(Continued)

(58) Field of Classification Search
CPC ............... G06F 3/04883; G06F 17/241; G06F 3/04886; G06F 3/0488; G06F 3/03545;
(Continued)

(56) References Cited

U.S. PATENT DOCUMENTS 2,117,363 A    5/1938   Rundstatler
5,146,833 A    9/1992   Lui
(Continued)

FOREIGN PATENT DOCUMENTS

FR    WO 2015117855 A1 *    8/2015    ......... G06F 3/03545

OTHER PUBLICATIONS

International Search Report dated May 15, 2015, International Application No. PCT/EP2015/051512, pp. 1-3.
(Continued)

*Primary Examiner* — Marlon Fletcher
(74) *Attorney, Agent, or Firm* — MH2 Technology Law Group, LLP

(57) ABSTRACT

Disclosed are music symbol recognition apparatuses and methods that recognise music symbols from handwritten music notations. Various implementations may process handwritten music notations by segmenting the handwritten music notations into a plurality of elementary ink segments and then grouping the segments into graphical objects based on spatial relationships between the segments. One or more candidate music symbols may be determined for each graphical object, along with a symbol cost for each symbol, which represents a likelihood that the graphical object belongs to a predetermined class of symbols. The music symbol candidates may be parsed to form graphs based on grammar rules, and the graph most likely to represent the handwritten music notations may be selected for display or other use. The selection may be based on the symbol costs associated with each candidate and on spatial costs associated with the grammar rules that are applied to the candidates.

21 Claims, 6 Drawing Sheets

(51) Int. Cl.
| | |
|---|---|
| *G10G 1/04* | (2006.01) |
| *G06K 9/00* | (2006.01) |
| *G06K 9/34* | (2006.01) |
| *G06K 9/68* | (2006.01) |
| *G06F 3/0354* | (2013.01) |
| *G06F 3/041* | (2006.01) |
| *G06K 9/62* | (2006.01) |

(52) U.S. Cl.
CPC ..... *G06K 9/00416* (2013.01); *G06K 9/00422* (2013.01); *G06K 9/342* (2013.01); *G06K 9/6256* (2013.01); *G06K 9/6878* (2013.01); *G06K 9/6885* (2013.01); *G10G 1/04* (2013.01); *G10H 2220/096* (2013.01)

(58) Field of Classification Search
CPC ........... G06F 3/041; G06F 2203/04104; G06F 3/03547; G06F 3/0414; G06K 2209/01; G06K 9/00402; G06K 9/00986; H04N 1/0036; H04N 2201/3263; H04N 2005/443; G06T 11/206
See application file for complete search history.

(56) References Cited

U.S. PATENT DOCUMENTS

| | | | |
|---|---|---|---|
| 6,201,174 B1 | 3/2001 | Eller | |
| 6,348,648 B1 | 2/2002 | Connick, Jr. | |
| 6,493,464 B1* | 12/2002 | Hawkins ............ | G06K 9/00429 382/189 |
| 6,538,187 B2 | 3/2003 | Beigi | |
| 7,183,476 B2 | 2/2007 | Swingle et al. | |
| 7,432,432 B2* | 10/2008 | Li ...................... | G06K 9/00416 84/470 R |
| 7,985,912 B2 | 7/2011 | Copperwhite et al. | |
| 8,053,657 B2* | 11/2011 | Sitrick ................. | G09B 15/002 84/470 R |
| 8,445,766 B2 | 5/2013 | Raveendran | |
| 2001/0036620 A1 | 11/2001 | Peer et al. | |
| 2009/0077053 A1 | 3/2009 | Lallican | |
| 2011/0167988 A1* | 7/2011 | Berkovitz .............. | G09B 15/02 84/483.2 |
| 2011/0203442 A1* | 8/2011 | Raveendran ............. | G10G 1/00 84/483.1 |
| 2014/0363083 A1* | 12/2014 | Xia ..................... | G06K 9/00436 382/189 |
| 2015/0228259 A1* | 8/2015 | Valente ................ | G06F 3/03545 84/483.2 |
| 2015/0277745 A1* | 10/2015 | Qian ................... | G06F 3/04883 715/863 |
| 2015/0339051 A1* | 11/2015 | Yang ................... | G06F 3/04883 382/189 |
| 2015/0339524 A1* | 11/2015 | Yang ................... | G06F 3/04883 382/189 |
| 2015/0370779 A1* | 12/2015 | Dixon ................. | G06F 3/04883 715/261 |
| 2016/0042657 A1* | 2/2016 | Granger ............... | G09B 15/023 84/477 R |

OTHER PUBLICATIONS

Kia Ng, "Music Manuscript Chasing", Lecture Notes in Computer Science, vol. 2390, Jan. 2002, pp. 330-342.
H. Fahmy et al., "A Graph Rewriting Paradigm for Discrete Relaxation: Application to Sheet-Music Recognition", International Journal of Pattern Recognition and Artificial Intelligence, vol. 12, No. 6, 1998, pp. 763-799.
Bertrand Couasnon et al., "Using a Grammar for a Reliable Full Score Recognition System", Proceedings of the International Music Conference, Jan. 1995, Retrieved from the internet: http://citeseerx.ist.psu.edu/viewdoc/download?doi=10.1.1.29.4927&rep=rep1&type=pdf, pp. 1-8.
David Bainbridge et al., "A music notation construction engine for optical music recognition", Software—Practice and Experience, vol. 33, No. 2, 2003, pp. 173-200.
Kian Chin Lee et al., "A Comparison of HMM, Naive Bayesian, and Markov Model in Exploiting Knowledge Content in Digital Ink: A Case Study on Handwritten Music Notation Recognition", IEEE International Conference on Multimedia and Expo, 2010, pp. 292-297.
Kian Chin Lee et al., "Handwritten Music Notation Recognition using HMM—a Non-Gestural Approach", International conference on Information Retrieval and Knowledge Management, 2010, pp. 255-259.
Jamie Anstice et al., "The Design of a Pen-Based Musical Input System", Proceedings of the Sixth Australian Conference on Computer-Human Interaction, 1996, pp. 260-267.
Eloi Batlle et al., "Automatic Segmentation for Music Classification using Competitive Hidden Markov Models", Retrieved from the Internet: http://mtg.upt.edu/files/publications/ismir2000-eloi.pdf, 2000, pp. 1-2.
Alex Bulis et al., "Computerized Recognition of Hand-Written Music Notes", Proceedings of the International Music Conference, 1992, pp. 110-112.
Donald Byrd, "Music Notation Software and Intelligence", Computer Music Journal, vol. 18, No. 1, 1994, pp. 17-20.
G. Sayeed Choudhury et al., "Optical Music Recognition System within a Large-Scale Digitization Project", Online Presentation ISMIR, 2000, pp. 1-4.
Bertrand Couasnon, "DMOS: A Generic Document Recognition Method, Application to an Automatic Generator of Musical Scores, Mathematical Formulae and Table Structures Recognition Systems", IEEE Proceedings of the Sixth International Conference on Document Analysis and Recognition, 2001, pp. 215-220.
Geoff Chirgwin, "Quil: An experimental system for online music notation handwriting recognition", Retrieved from the Internet: http://slides.iquil.com, May 2010, pp. 1-21.
H. Fahmy et al., "A Graph Grammar for High-level Recognition of Music Notation", Proceedings of 1st International Conference on Document Analysis and Recognition, vol. 1, 1991, pp. 70-78.
Andrew Forsberg et al., "The Music Notepad", Proceedings of the 11th annual ACM symposium on User Interface software and technology, 1998, pp. 203-210.
Susan E. George, "Pen-Based Input for On-Line Handwritten Music Notation", Doctoral dissertation, IRM Press, 2005, pp. 128-160.
Perfecto Herrera et al., "Towards instrument segmentation for music content description: a critical review of Instrument classification techniques", International symposium on music information retrieval ISMIR, vol. 290, 2000, pp. 1-9.
Francis J. Kiernan, "Score-based style recognition using artificial neural networks", ISMIR, 2000, pp. 1-2.
Ivan Leplumey et al., "Comparison of Region Labelling for Musical Scores", Proceedings of First International Conference on Document Analysis, vol. 2, 1991, pp. 674-682.
Karen Lin et al, "Integrating Paper and Digital Music Information Systems", In ISMIR, vol. 1, 2000, pp. 1-7.
Sebastien Mace et al., "A generic method to design pen-based systems for structured document composition: Development of a musical score editor", Proceedings of the 1st Workshop on Improving and Assessing Pen-Based Input Techniques, 2005, pp. 15-22.
Philippe Martin et al., "Low-Level Analysis of Music Drawing Images", First International Conference Document Analysis and Recognition, 1991, pp. 417-425.
Youichi Mitobe et al., "A Fast HMM Algorithm Based on Stroke Lengths for On-line Recognition of Handwritten Music Scores", IEEE Proceedings of the 9th Int'l Workshop on Frontiers in Handwriting Recognition, 2004, pp. 1-6.
Hidetoshi Miyao et al., "An Online Handwritten Music Symbol Recognition System", International Journal of Document Analysis and Recognition, vol. 9, No. 1, 2007, pp. 1-20.
Elizabeth Ng et al., "Improvements to a Pen-Based Musical Input System", IEEE Inozchi, 1998, pp. 1-8.
Han-Wen Nienhuys et al., "Lilypond, A System for Automated Music Engraving", Proceedings of the XIV Colloquium on Musical Informatics, 2003, pp. CIM1-CIM6.

(56) References Cited

OTHER PUBLICATIONS

D. V. Oppenheim, "DMIX: A Multifaceted Environment for Composing and Performing Computer Music", Computers & Mathematics with Applications, vol. 32, No. 1, 1996, pp. 117-135.
Ana Rebelo et al., "Optical Music Recognition—State-of-the-Art and Open Issues", International Journal of Multimedia Information Retrieval, vol. 1, No. 3, 2012, pp. 173-190.
Scott Sheridan et al., "Defacing Music Scores for Improved Recognition", Proceedings of the Second Australian Undergraduate Students' Computing Conference, 2004, pp. 142-148.
Katherine Silberger, "Putting composers in control", IBM Research, vol. 23, No. 4, 1996, pp. 1-6.
Ron B. Yeh et al., "Iterative Design and Evaluation of an Event Architecture for Pen-and-Paper Interfaces", Proceedings of the 21st annual ACM symposium on User interface software and technology, ACM, 2008, pp. 1-10.
Sebastien Mace et al., "A generic method to design pen-based systems for structured document composition: Development of a musical score editor", IRISA—INSA de Rennes, Campus Universitaire de Beaulieu, France, Proceedings of the 1st Workshop on Improving and Assessing Pen-Based Input Techniques, Edinburgh, Sep. 2005, pp. 15-22.

* cited by examiner

| Graphical objects GO | Music symbol candidates MSC | assigned symbol cost SC |
|---|---|---|
| GO1 | MSC11 ♩<br>MSC12 ♭ | SC11<br>SC12 |
| GO2 | MSC21 ♩. | SC21 |
| GO3 | MSC31 ●<br>MSC32 ○ | SC31<br>SC32 |
| GO4 | MSC41 \| | SC41 |
| GO5 | MSC51 —<br>MSC52 \|<br>MSC53 ● | SC51<br>SC52<br>SC53 |
| GO6 | MSC61 \|<br>MSC62 ● | SC61<br>SC62 |
| GO7 | MSC71 ● | SC71 |
| GO8 | MSC81 ○<br>MSC82 ● | SC81<br>SC82 |
| GO9 | MSC91 \| | SC91 |

FIG.7

METHOD AND APPARATUS FOR RECOGNISING MUSIC SYMBOLS

CROSS REFERENCE TO RELATED APPLICATIONS

This application is a continuation of and claims the benefit of U.S. patent application Ser. No. 14/176,800 filed on 10 Feb. 2014, (now allowed), which is incorporated herein by reference in its entirety.

BACKGROUND

This disclosure relates to the conversion of handwritten music notations into music symbols and concerns more particularly a method of recognising music symbols based on handwritten music notations in digital format, and an apparatus for implementing such a method.

Various implementations consistent with the invention can be applied to handwritten music notations inputted by a user on an input device or to handwritten music notations previously received or stored in electronic format (e.g. in an electronic document) and processed for the purpose of recognising music symbols.

Over the last few years, computer systems based on an interaction with a pen or the like, such as smartphones, pocket PC or tablet PC have been subject to a significant growth. Using fingers or a stylus on a touch screen is very intuitive as it enables the user to write or compose in a natural manner as he would do on a piece of paper.

There now exist many input devices equipped with a touch screen which have capabilities for recognizing handwritten notations inputted by a user.

The interpretation of handwritten drawings realised for instance on a touch screen (e.g., on-line recognition) requires complex processing as these drawings may contain many elements of various natures, depending on the type of notations used, the style of the user, etc. Recognition of an on-line document can occur either on-the-fly or upon detection of a particular condition, such as the explicit request of the user. On-the-fly recognition systems transform the strokes of the users into their corresponding symbolic representation directly or simultaneously while the document is being composed, which requires significant processing capabilities.

Handwritten music recognition is a particular domain that has been subject to several advances over the last years. While some improvements have been achieved for off-line recognition systems, in particular for optical method applied to scanned music notation, music symbol recognition for on-line recognition systems are not satisfactory in terms of efficiency and user-friendliness.

For example, U.S. Pat. No. 6,538,187 describes a system whereby a menu of music notes is provided on a music editor application for the user to click on desired notes or music symbols. This application, however, has several shortcomings, including constraints that make it difficult for a user to compose music symbols in a natural and easy manner.

Accordingly, it is desirable to have a solution which enables very efficient recognition of music symbols based on handwritten music notations. A high degree of efficiency is required for fast, practical processing of music notations inputted by a user on an input device such as a touch screen or for handwritten music notations stored beforehand in an electronic format for later processing. There is also desirable to have more user-friendliness in the manner the user composes the music notations.

SUMMARY

Various embodiments of the present invention address the drawbacks mentioned above. Various objectives and advantages of the present invention may be derived from the present document.

Various embodiments of the present invention provide methods implemented by a music symbol recognition apparatus for recognising music symbols based on handwritten music notations. Various embodiments may include apparatus and operations for:

detecting handwritten music notations;

pre-segmenting the handwritten music notations into a plurality of elementary ink segments;

grouping the elementary ink segments into graphical objects based on spatial relationships between elementary ink segments, wherein each elementary ink segment belongs to one or more of the graphical objects;

determining for each graphical object at least one music symbol candidate, in association with an assigned symbol cost representative of the likelihood that the graphical object belongs to a predetermined class of the music symbol candidate, the determination being based on graphical features extracted from the graphical object; and parsing the musical symbol candidates, wherein the parsing includes:

forming one or more graphs by applying at least one of a predetermined set of grammar rules to the music symbol candidates, wherein each graph comprises at least one non-terminal node corresponding to a grammar rule applied to a set of at least one descendant node, wherein each descendant node is either a terminal node corresponding to a music symbol candidate or a non-terminal-node corresponding to a grammar rule applied to at least one other descendant node;

associating each grammar rule applied to at least two descendant nodes with a spatial cost representative of the pertinence of the applied grammar rule based on the spatial relationships between the graphical objects of the at least two descendant nodes in accordance with the definition of the applied grammar rule; and selecting at least one graph as the most representative graph of the handwritten music notations based on the symbol costs associated with each music symbol candidate and the spatial costs associated with each applied grammar rule.

Various embodiments of the present invention may be advantageous in that the takes into account the symbol costs and the spatial costs to select the most pertinent graphs, thus allowing the embodiment to find the best symbolic representation for handwritten music notations. Thanks to the complementarity of the symbol costs, on one hand, and the spatial costs, on the other hand, the selecting unit detects the most pertinent combination of graphs to the handwritten music notations at hand.

Music notations are generally drawn according to standard composition rules which are well known to musicians and composers. Various embodiments of the present invention takes into account the specific rules and ways according to which music notations are usually composed so as to achieve optimal recognition efficiency.

In a particular embodiment, the forming step includes attempting recursively to apply each of the set of grammar rules to the music symbol candidates.

In a particular embodiment, the parsing includes calculating for each graph a total cost, taking into account each symbol cost assigned to the music symbol candidates of the graphs and each spatial cost associated with the at least one grammar rule applied in the graph.

In a particular embodiment, the selecting is based on the total costs obtained for each graph.

In a particular embodiment, the total cost for each graph is obtained by summing at least each spatial cost and symbol cost of the graph.

In a particular embodiment, the selecting includes determining each possible graph representing the detected handwritten music symbols and choosing the graph having the lowest total costs.

Some particular embodiments include displaying on a display of a music symbol recognition apparatus the symbol candidates of the at least one selected graph.

In a particular embodiment, each symbol candidate this is displayed replaces the corresponding graphical objects present on the display.

Some particular embodiments include normalising the detected handwritten music symbols prior to the pre-segmenting. Applying the normalisation to the detected handwritten music notations allows the embodiment to render it invariable and independent of the initial writing style.

In a particular embodiment, the determining of at least one music symbol candidate is performed by a neural network. The ability to learn of classifiers such as neural networks can significantly improve the classification efficiency in the determining step, operation, or unit. A determining unit can be trained to learn different styles of different people.

In a particular embodiment, each grammar rule defines, when applicable:
  a predetermined association of a music symbol or a group of music symbols with at least a non-terminal node, and
  if there are at least two descendant nodes in the association, a value of the spatial cost representative of the pertinence of the grammar rule as a function of the spatial relationships of the graphical objects corresponding to the descendant nodes with each other.

Some particular embodiments include producing a parse tree based on each graph selected as the most representative of the detected handwritten music symbols.

In a particular embodiment, the determining of the music symbol candidates includes extracting at least one of static graphical features and dynamic graphical features of the graphical objects, the determination being based on the result of the extraction.

In some particular embodiments of the detecting, the music notation recognition apparatus detects the handwritten music symbols which are inputted by a user on an input surface of the music notation recognition apparatus.

In a particular embodiment, the method for recognising music symbols is implemented by computer program instructions.

Accordingly, this disclosure also describes a computer program on a recording medium, this computer program being arranged to be implemented by a music symbol recognition apparatus, and more generally by a computer, this computer program comprising instructions adapted for the implementation of a method for recognizing music symbols as described in this disclosure.

The computer programs consistent with embodiments of the invention can be expressed in any programming language, and can be in the form of source code, object code, or any intermediary code between source code and object code, such as in a partially-compiled form, for instance, or in any other appropriate form.

This disclosure also describes a non-transitory recording medium readable by a music symbol recognition apparatus, or more generally by a computer, this recording medium comprising computer program instructions as mentioned above.

The non-transitory recording medium previously mentioned can be any entity or device capable of storing the computer program. For example, the recording medium can comprise a storing means, such as a ROM memory (a CD-ROM or a ROM implemented in a microelectronic circuit), or a magnetic storing means such as a floppy disk or a hard disk for instance.

Some recording mediums for certain embodiments of the invention can correspond to a transmittable medium, such as an electrical or an optical signal, which can be conveyed via an electric or an optic cable, or by radio or any other appropriate means. A computer program for certain embodiments of the invention can in particular be downloaded from the Internet or a network of the like.

Alternatively, the recording medium can correspond to an integrated circuit in which a computer program is loaded, the circuit being adapted to execute or to be used in the execution of a method for some embodiments of the invention.

This disclosure also describes embodiments of a music symbol recognition apparatus for recognising music symbols based on handwritten music notations that may include:
  a detecting unit for detecting handwritten music notations;
  a pre-segmenting unit for pre-segmenting the handwritten music notations into a plurality of elementary ink segments;
  a grouping unit for grouping the elementary ink segments into graphical objects based on spatial relationships between elementary ink segments, wherein each elementary ink segment belongs to one or more of the graphical objects;
  a determining unit for determining for each graphical object at least one music symbol candidate, in association with an assigned symbol cost representative of the likelihood that the graphical object belongs to a predetermined class of the music symbol candidate, the determination being based on graphical features extracted from the graphical object; and
  a parsing unit for parsing the musical symbol candidates, wherein the parsing unit may include:
    a forming unit for forming one or more graphs by applying at least one of a predetermined set of grammar rules to the music symbol candidates, wherein each graph comprises at least one non-terminal node corresponding to a grammar rule applied to a set of at least one descendant node, wherein each descendant node is either a terminal node corresponding to a music symbol candidate or a non-terminal-node corresponding to a grammar rule applied to at least one other descendant node;
    an associating unit for associating an applied grammar rule applied to at least two descendant nodes with a spatial cost representative of the pertinence of the applied grammar rule based on the spatial relationships between the graphical objects of the at least two descendant nodes in accordance with the definition of the applied grammar rule; and a selecting unit for selecting at least one graph as the most representative graph of the handwritten music notations based on the symbol costs associated with each music symbol candidate and the spatial costs associated with each applied grammar rule.

It should be noted that the various embodiments mentioned above in reference to the method for recognising music symbols according to the invention can be implemented in an analogous manner in relation with the music symbol recognition apparatus embodiments of the invention. Additionally, the advantages and comments set out above in reference to the various embodiments of the method for recognising music symbols apply in an analogous manner to the various embodiments of the music symbol recognition apparatus embodiments according to the invention.

In a particular embodiment, the apparatus includes an input surface, wherein the detecting unit is configured to detect handwritten music symbols inputted by a user on the input surface.

In a particular embodiment, the determining unit is a neural network.

BRIEF DESCRIPTION OF THE DRAWINGS

Other characteristics and advantages of the invention will become more apparent upon reading the following description of a preferred embodiment, given for non-limiting and illustrative proposes only, and from the appended drawings, in which:

FIG. 7 shows a table listing music symbol candidates and respective assigned symbol costs as determined by a determining unit of the music symbol recognition apparatus according to a particular embodiment of the present invention;

DETAILED DESCRIPTION

Various embodiments consistent with the invention relate to the conversion of handwritten music notations into music symbols and concern more particularly methods of recognising music symbols based on handwritten music notations in digital format, and apparatuses for implementing such a method.

As indicated earlier, embodiments of the present invention can be applied to handwritten music notations inputted by a user on an input device or to handwritten music notations previously stored or received in electronic format (e.g. in an electronic document) for later processing.

In this disclosure, the term "music notation" relates to any kind of notation or score that a user may draw when composing music. A music notation may for instance refer to a quarter note (or "crotchet"), an eight note, a half note (or "minim"), a whole note, a key (treble clef, bass clef . . . ), a simple or compound time, a quarter-note rest, an alteration such as a flat, a sharp or a dot, or the like. The pitch of each note may depend on its position on staff lines (if any). It should however be understood that the use of a music staff is not mandatory to implement embodiments of the present invention.

Music notations are generally drawn according to standard composition rules which are well known to musicians and composers. Various embodiments of the present invention take into account the specific rules and ways according to which music notations are usually composed so as to achieve optimal recognition efficiency.

Some particular embodiments of the present invention will now be described in reference to FIGS. 1 to 9.

Figure 1:
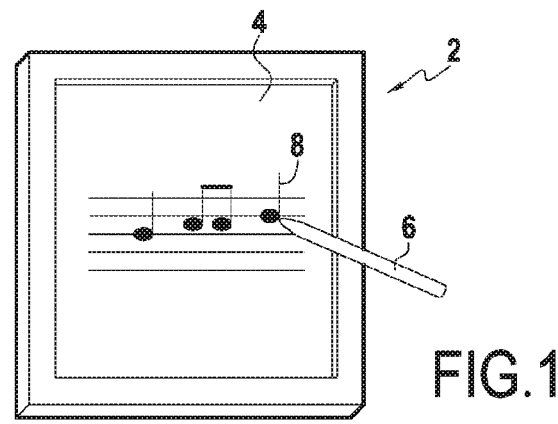
FIG. 1 is an external representation of a music symbol recognition apparatus according to a particular embodiment of the present invention.

FIG. 1 depicts an exemplary music symbol recognition apparatus 2 suitable for performing music symbol recognition according to a particular embodiment of the present invention. The music symbol recognition apparatus 2 is in this case a handheld touchscreen device (such as a tablet computer for instance) and will be referred to hereinafter as "terminal 2" for a matter of simplicity.

It is noted that, although the exemplary embodiments are explained herein as implemented on a tablet computer, one of ordinary skill in the art would recognize that embodiments of the present invention can be implemented on any computer-like apparatus having an appropriate processor and memory devices that support the processing described herein. The music symbol recognition apparatus according to embodiments of the present invention can be a personal digital assistant (PDA), a mobile phone, a laptop or desktop computer, or the like.

In the present example, terminal 2 includes a touch screen 4 (or a digitizer) allowing a user to input thereon handwritten music notations 8 when composing music. Touch screen 4 is operable to display the handwritten music notations inputted by the user and the results of the music symbol recognition process which is to be performed by terminal 2 in accordance with various embodiments of the present embodiment.

Music notation input can be performed by applying a stylus 6, a finger or the like on the surface of the touch screen 4. This touch screen 4 is able to capture the movements made thereon by the user with the stylus 6. As explained in more detail hereafter, the contacts between the stylus 6 and the touch screen 4 give rise to the generation of strokes of digital ink. The various ink strokes drawn by the user are to be processed by the terminal 2 for conversion into corresponding music symbols.

It should be noted that the music symbol recognition apparatus according to various embodiments of the present invention does not necessarily include a touch screen or, more generally, a user input interface for entering music notations 8.

The music symbol recognition apparatus may obtain music notations previously stored in electronic format (e.g. in an electronic document) and convert the music notations into equivalent music symbols. Alternatively, the music symbol recognition may process music notations received in electronic format from outside terminal 2.

Figure 2:
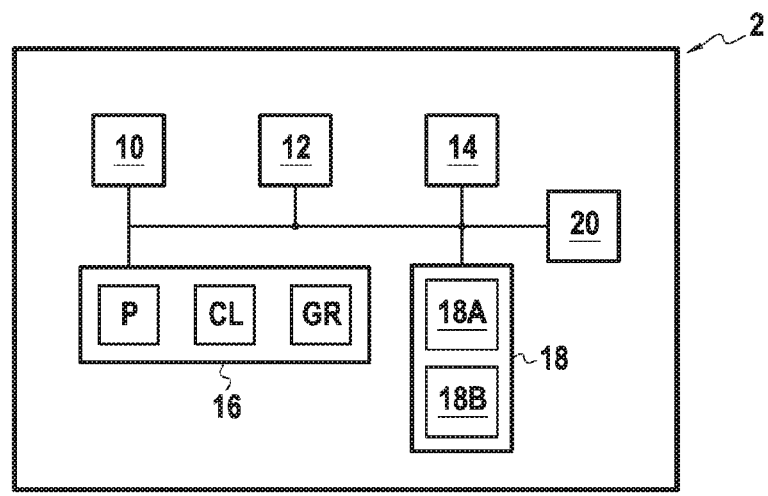
FIG. 2 is a block diagram showing the main hardware components of the music symbol recognition apparatus of FIG. 1 according to a particular embodiment of the present invention.

FIG. 2 shows an exemplary hardware architecture of terminal 2. In this example, terminal 2 presents the hardware structure of a computer. In particular, terminal 2 comprises a controller 10 (e.g. a processor), a RAM memory 12, a ROM memory 14, a rewritable non-volatile memory 16 (e.g. of the EEPROM type), a user interface 18 and a communication interface 20 enabling terminal 2 to communicate with external devices (based on WiFi technology for instance).

Controller 10 cooperates with each of the other components of terminal 2 via a bus line.

Rewritable non-volatile memory 16 of terminal 2 constitutes a recording medium (e.g., a non-transitory computer readable medium) in accordance with a particular embodiment of the invention. Memory 16 includes a computer program P according to a particular embodiment of the invention, this computer program comprising instructions to implement a method according to a particular embodiment of the invention. The main steps of this method (S2 to S18) will be described in detail in reference notably to the flowchart of FIG. 9.

The uses and purposes of the classes CL and the set GR of grammar rules stored in memory 16 will be more apparent herebelow with reference to FIGS. 4-9.

User interface 18 includes an input unit 18A for enabling a user to input handwritten music notations 8 and an output unit 18B enabling terminal 2 to display handwritten music notations 8 or corresponding music symbols obtained as a result of the music symbol recognition according to the principles of the invention. Input and output units other than a touch screen may be contemplated within the scope of the present invention.

In the present embodiment, the touch screen 4 forms simultaneously an input surface and a display surface. Other embodiments may be contemplated where the input surface and the display surface are separate from each other (e.g. a touch pad distinct from a screen).

As mentioned earlier, inclusion of user interface 18 is not mandatory to perform the invention.

Figure 3:
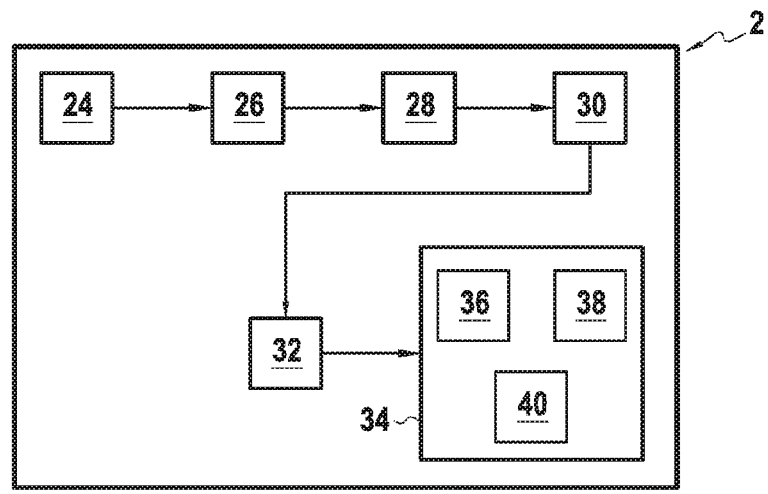
FIG. 3 is a block diagram showing the main functional units of the music symbol recognition apparatus of FIG. 1 according to a particular embodiment of the present invention.

FIG. 3 is a functional diagram showing functional units that are implemented by controller 10 when running computer program P according to a particular embodiment of the invention.

In the present example, terminal 2 includes a storage unit 24 which can be used to store handwritten music notations 8 in electronic format. To this end, storage unit 24 may store an electronic document including one or more handwritten music notations. Storage unit 24 may for instance be implemented by memory 16 operating under the control of controller 10.

Detecting unit 26 is operable to detect handwritten music notations (or part thereof). The detected handwritten music notations may originate from various sources. Detecting unit 26 may detect handwritten music notations 8 inputted by a user by means of user interface 18. Alternatively, detecting unit 26 may retrieve handwritten music notations 8 from storage unit 24 and/or receive handwritten music notations 8 from outside of terminal 2 (e.g. by means of communication interface 20). Each handwritten music notation is for instance represented by a set of (x, y) coordinates. Although this is not required, staff lines are preferably displayed to visually help the user while he is composing music.

Pre-segmenting unit 28 is operable to perform pre-segmentation of the detected handwritten music notations into a plurality of elementary ink segments. As will be explained in more detail below, an elementary ink segment (also called ink segment hereinafter) defines any elementary portion of the outline of a handwritten music notation. An elementary ink segment is for instance delimited by two consecutive adjacent segmentation points arranged on the outline of a notation. Each ink segment represents a handwritten music notation or a portion thereof. The generated ink segments are used later on for determining appropriate music symbol candidates.

Grouping unit 30 is operable to group the ink segments into graphical objects based on spatial relationships between the ink segments. Each ink segment may belong to one or more graphical objects.

Determining unit (or classifier) 32 is operable to determine, for each graphical object formed by grouping unit 30, at least one music symbol candidate in association with an assigned symbol cost. Each symbol cost assigned by determining unit 32 is representative of the likelihood that the corresponding graphical object belongs to a predetermined class of the determined music symbol candidate among the classes CL stored in memory 16.

In this example, the higher the symbol cost the lower the probability that the music symbol candidate is a good candidate for the corresponding graphical object. Alternatively, a symbol score which increases when the likelihood of a class match increases may be used instead of the symbol cost SC. A score can be converted into a cost by the function (–log).

The determination performed by determining unit 32 is based on graphical features which it extracts from the graphical objects undergoing the symbol recognition processing.

Parsing unit 34 is operable to process the output of determining unit 32 so as to convert the handwritten music notations 8 into appropriate music symbols having well-known meaning for the user. In the present embodiment, the parsing unit 34 comprises the three following units (or sub-units):

forming unit 36;
associating unit 38; and
selecting unit 40.

Forming unit 36 is operable to form one or more graphs by applying at least one grammar rule from the predetermined set GR of grammar rules (stored in memory 16) to the music symbol candidates generated by determining unit 32. As explained in more detail hereafter, each of these graphs comprises at least one non-terminal node corresponding to a grammar rule applied to a set of at least one descendant node. Each grammar rule is defined so as to be applied to one or more descendant nodes. Each descendant node is either a terminal node corresponding to a music symbol candidate or a non-terminal node corresponding to a grammar rule applied to at least one other descendant node.

A terminal node does not have any descendant whereas a non-terminal node has at least one descendant in the graph.

As indicated earlier, depending on the definition thereof, a grammar rule may be applicable to one or more descendant nodes. Associating unit 38 is operable to associate each grammar rule applied in the graphs to at least two descendant nodes with a spatial cost representative of the pertinence of the applied grammar rule. The spatial cost is determined based on the spatial relationships between the graphical objects of the at least two descendant nodes in accordance with the definition of the applied grammar rule.

Selecting unit 40 is operable to select at least one graph as the most representative graph of the handwritten music notations being processed, based on the symbol costs associated with each music symbol candidate and the spatial costs associated with each applied grammar rule.

The main steps S2 to S18 of an exemplary embodiment of a method (shown in FIG. 9) for recognising music symbols implemented by the terminal 2 will now be described in reference to FIGS. 4 to 9. The operation of the above functional units of terminal 2 will be more apparent from the exemplary embodiment illustrated in FIGS. 4 to 9.

Figure 4:
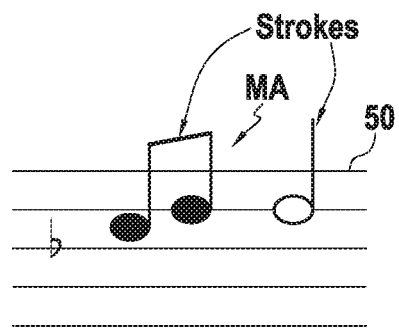
FIGS. 4, 5 and 6 schematically show how the detecting unit, the pre-segmenting unit and the grouping unit of the music symbol recognition apparatus operate according to a particular embodiment of the present invention.

In this example, detecting unit 26 detects (S2 of FIG. 9) handwritten music notations MA as illustrated in FIG. 4. As can be seen in this case, the detected music notations MA successively include: a flat, two eight notes and a half note. These music notations are represented by digital ink strokes on staff lines 50.

The music notations MA can be either inputted by the user by means of input unit 18A of the user interface 18, retrieved from storage unit 24 or received directly from outside of terminal 2 (or any combination thereof). In any case, storage unit 24 can be used to store the handwritten music notations or any intermediary or final data results when implementing music symbol recognition according to various embodiments of the present invention.

The two eight notes are each formed of a filled-in oval note head and a straight, flagless stem facing up from the right of the note head. The two stems are connected with a beam. The half note is notated with a hollow oval note head and a straight note stem facing up with no flag.

If necessary, in some embodiments, terminal 2 applies an optional pre-processing (S4) to the acquired digital ink strokes so as to normalise them and thereby render these strokes invariable and independent of the initial writing style. The decision as to whether or not to apply such a pre-processing and, in the positive case, as to the nature of this pre-processing, may depend for instance on the level of quality required for performing music symbol recognition.

This normalization S4 may include, among other things, any of the following transformations (or any combination thereof):
- a position normalization based on input signal centering (e.g., centering of a drawn note head), particularly in regards to the staff line position, thereby allowing a first homogenization of the input signal;
- a size normalization with respect to the staff interlines or to any other reference size;
- a signal smoothing based on a smoothing algorithm, for example, a B-Spline or a Bezier curve fitting, this being useful in case, for instance, of low spatial resolution of the input signal; and
- a point interpolation, this being useful in case, for instance, of low acquisition resolution of the input signal.

As will be clear to those skilled in the art, this pre-processing may be based on any other normalisation criteria not listed above.

Figure 5:
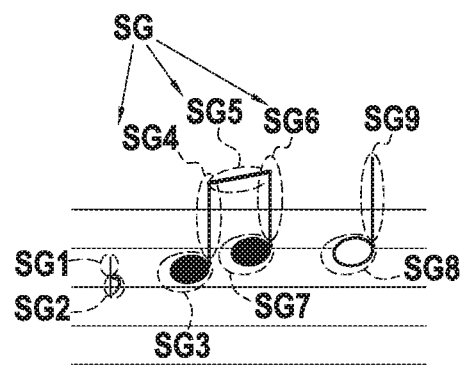

As shown in the example of FIG. 5, once pre-processing S4 is completed (unless it is optionally not done), pre-segmenting unit 28 performs (S6) pre-segmentation of the handwritten music notations MA into a plurality of elementary ink segments. To do so, the digital ink strokes of music notations MA are segmented into elementary ink segments SG1 to SG9. These ink segments SG constitute the smallest ink parts that can be processed by terminal 2 for later recognition of music symbols.

Pre-segmentation S6 is based on detection of particular points defining locations for breaking a stroke or combination of strokes into its constituting segments. Such a particular point may for instance correspond to a crossing point between two ink strokes, a change in the slope of an ink stroke, a particular angle in a notation etc. As can be understood with respect to computer input technology and graphical analysis, various techniques may be used to break down handwritten music notations 8 into elementary ink segments. Those skilled in the art will know how to implement such a pre-segmentation such that no further detail is provided in this respect.

In the present example, the flat notation shown on the left of FIG. 5 is broken down into ink segments SG1 and SG2. Additionally, the two eight notes are broken down into ink segments SG3 to SG7 corresponding to the two filled-in note heads, the two corresponding stems and the beam therebetween. The half note is broken down into ink segments SG8 and SG9. This is but one example of a break down, and other ink segmentations may however be contemplated in this particular example.

Figure 6:
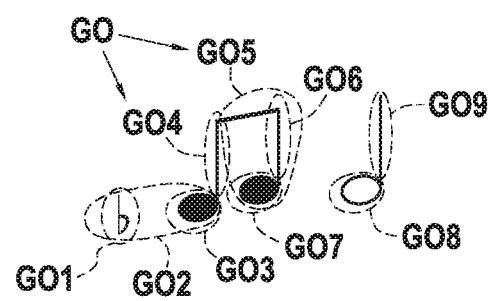

As shown in FIG. 6, grouping unit 30 then groups (S8) the elementary ink segments SG1 to SG9 into particular sets of at least one ink segment, each set forming a graphical object GO referenced as GO1 to GO9 in the present example. Each graphical object constitutes an entity that has no symbolic meaning at this stage for terminal 2. These entities will be later processed by terminal 2 for conversion into appropriate music symbols.

In this example, for instance, the two first ink segments SG1 and SG2 are grouped to form a first graphical object GO1 representing the flat.

As explained earlier, each ink segment SG1-SG9 belongs to one or more of the generated graphical objects GO1-GO9. Graphical object GO5, for instance, encompasses graphical objects GO6 and GO7 along with the beam SG5 connecting the two ink segments SG4 and SG6. Other choices of grouping could however be made depending on the implementation used for recognizing music symbols.

Grouping operation S8 is performed based on spatial relationships between the elementary ink segments. In this particular example, grouping unit 30 groups the ink segments SG1-SG9 into graphical objects GO1-GO9 based on at least one of the criteria below:
- the distance between ink segments;
- the relative horizontal and/or vertical position of ink segments; and
- Any relevant ink properties that could differentiate between ink segments (e.g. size).

In various embodiments, any other appropriate criteria may be applied depending on the needs in each particular case.

After completion of step S8, determining unit (or classifier) 32 determines (S10), for each graphical object GO1-GO9 generated by grouping unit 30, at least one music symbol candidate MSC in association with an assigned symbol cost SC. The result of determination step S10 can be represented in the form of a table as shown in FIG. 7, this exemplary table listing the music symbol candidates MSC and the respective assigned symbol costs SC determined by determining unit 32 for each of the graphical objects GO1 to GO9.

Each assigned symbol cost SC is representative of the likelihood that the respective graphical object belongs to a predetermined class among the classes CL stored in memory 16. A symbol candidate list is build considering the most likely classes given a certain graphical object as input.

In this example, the lower the cost SC, the higher the likelihood of correspondence of a graphical object to a predetermined class. Alternatively, a symbol score which increases when the likelihood of a class match increases may be used instead of the symbol cost SC. As indicated earlier, a score can be converted into a cost by the function (−log).

In various implementations, a programmer can create or delete classes, and adapt their definitions to meet the needs of each particular case.

In this example, a class specifies one or various ways of drawing a particular music symbol in terms of at least one graphical feature criterion. As a result, determining unit 32 can learn from predetermined classes to recognise music symbols based on graphical features of graphical objects.

A class corresponds to one of the music symbols recognizable by the determining unit 32 (e.g. stem, black note head, white note head, flat sign, etc.). A symbol candidate is an instance of a class for a particular graphical object.

Determining unit 32 performs the determination S10 based on graphical (e.g., geometrical) features extracted from each of the graphical objects GO1-GO9. Determining unit 32 compares the graphical features of each graphical object with the classes of the predetermined set CL and looks for or attempts to identify a match. If the graphical features of a given graphical object coincide, correspond or otherwise correlate (to some extent at least) with the definition of a particular class, determining unit 32 deduces that the given graphical object might belong to this particular class, and then a symbol candidate of that class is added to the candidate list for that given graphical object.

Determination S10 can for instance be based on predetermined static graphical features of the graphical objects, predetermined dynamic graphical features of the graphical objects, or both.

In a particular embodiment, determining step S10 for the music symbol candidates includes extracting at least one of the static graphical features or the dynamic graphical features of a graphical object GO, and making the determination S10 based on the result of the extraction.

In various embodiments, dynamic graphical features may include or be related to dynamic information associated with the movement of an object, such as a stylus or finger, used to create ink strokes. Dynamic information can for instance be extracted from the trajectory of the stylus 6 and is based on information such as the position, direction and curvature of the ink strokes forming the graphical objects. Static information, on the other hand, can be computed for instance from a bitmap representation of ink and is typically based on projections and/or histograms.

As can be seen from the results shown in FIG. 7, one or several music symbol candidates may be determined for each graphical object. For graphical object GO2, for instance, the music symbol candidate is clearly inappropriate. As a result, the corresponding symbol cost SC21 assigned by the determining unit 32 is very high, meaning that the probability is low that music symbol candidate MSC21 is a good candidate for graphical object GO2.

In some cases, determining unit 32 may not find any class to which a particular graphical object may belong such that no respective music symbol candidate is outputted. This may for instance happen if the graphical object has been poorly defined by the grouping unit 30.

In a particular embodiment, determining unit 32 is a classifier. For non-limiting illustrative purposes, determining unit 32 may be based on at least one of the following means:

Kohonen neural networks;
A support vector machine;
Kernel methods;
Hidden Markov models;
Neural networks;
other pattern recognition paradigms.

The use for instance of a neural network classifier for identifying music symbols obtained from an on-line, pen-based input mechanism is well known to those skilled in the art and will therefore not be described in detail in the present document. More specifically, artificial neural network-based (ANN) approaches to music symbol recognition has already been contemplated in the past. ANN can be used as a statistical method of pattern recognition that must "learn" to recognise patterns through a training process. In a particular embodiment, the parameters of an ANN, expressed in terms of "weights" between network nodes, are adjusted during the training phase. Once trained, the networks can be presented with new music notations which they will be able to process and classify, even though they may never have encountered anything exactly of the like before.

The ability to learn possessed by these ANN systems can significantly improve the classification efficiency in step S10. Determining unit 32 can be trained to learn different styles of different people.

A multi-layer perceptron (MLP), a widely used form of ANN, can be used in the determining unit 34 in some embodiments to perform the determining step S10.

In a particular embodiment, at the stage of determining step S10, some of the music symbol candidates presented by determining unit 32 can be rejected or validated, as soon as they have a symbol cost higher, or else, on the contrary, lower than a predetermined threshold. In a particular embodiment, determining unit 32 is configured to perform pruning of the music symbol candidates having a very low probability, i.e. having a symbol cost higher than a predetermined threshold for instance. Pruning allows reducing the volume of data to be processed, thereby gaining speed and increasing resource use efficiency. It should be understood that this threshold making it possible to retain or else reject a music symbol candidate may be configured by the user, e.g. based on the level of relevance of the recognition that they wish to achieve for a particular recognition processing.

The parsing unit 34 then performs parsing (S12) of the music symbol candidates to determine the most appropriate music symbol candidate for each graphical object. In this example, this parsing operation S12 includes the steps S14, S16 and S18 further described below.

More specifically, forming unit 36 forms (S14) one or more graphs by applying at least one of the predetermined set GR of grammar rules to the music symbol candidates previously determined by determining unit 32.

FIGS. 8A to 8E show exemplary graphs GR1 to GR11 which may be formed (S14) by forming unit 36 of the present disclosure.

As indicated earlier, each of graphs GR1-GR11 comprises at least one non-terminal node corresponding to a grammar rule applied to a set of at least one descendant node. Each descendant node is either a terminal node (i.e. a node with no descendancy) corresponding to one of the music symbol candidates previously determined by determining unit 32, or a non-terminal node (i.e. a node with at least one descendant node) corresponding to a grammar rule (among set GR) applied to at least one other descendant node.

As can be seen from the exemplary graphs in FIGS. 8A to 8E, depending on the definition thereof, a grammar rule may be applicable to either one or a plurality of descendant nodes.

In the embodiment shown, forming unit 36 tries to apply each grammar rules of the predetermined set GR stored in memory 16 to the music symbol candidates MSC previously obtained by determining unit 32.

In a particular embodiment, forming unit 36 recursively attempts to apply each grammar rule of the predetermined set GR to each music symbol candidate. As already indicated, each grammar rule can be applied to one or several descendant nodes. In a particular embodiment, forming unit 36 tries to apply each grammar rule to a number of descendant nodes as specified in the definition of the grammar rule.

A particular grammar rule may or may not be applicable to a particular set of at least one music symbol candidate. In case it is applicable, forming unit 36 outputs a graph in accordance with the definition of the grammar rule. Otherwise, no graph is outputted.

In a particular embodiment, each grammar rule applied in step S14 defines a predetermined association of a particular music symbol or a group of music symbols with at least a non-terminal node.

As indicated above, forming unit 36 forms (S14) one or more graphs by applying at least one grammar rules to the music symbol candidates previously determined by determining unit 32. The way forming unit 36 constructs the graphs may vary depending on each case and can be adapted by the programmer or user as appropriate. FIGS. 8A to 8E are only provided for non-limiting illustrative purposes. Only a few possible graphs are shown in the figures for the purpose of explaining an example of implementation. It should however be understood that others graphs could be formed in this particular example based on the principles of the present invention.

Figure 8A:
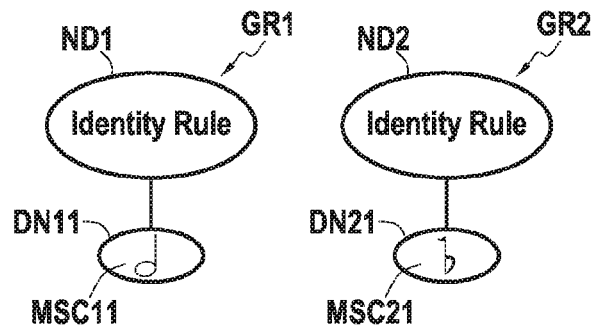
FIGS. 8A to 8F show various graphs formed by the forming unit of the music symbol recognition apparatus according to a particular embodiment of the present invention.

As shown in FIG. 8A, forming unit 36 generates a graph GR1 by applying an "Identity" rule to MSC11 and generates in the same manner a graph GR2 by applying that same Identity rule to MSC12. Graph GR1 is formed of the non-terminal node ND1 corresponding to the Identity rule applied in this case, and one descendant node DN11, which in this case is a terminal node corresponding to the music symbol candidate MSC11. Analogous comments apply to graph GR2 which is formed by applying the "Identity" rule to MSC21 to produce non-terminal node ND2 and one descendant terminal node DN21.

In this embodiment, no association of a music symbol candidate is made by the Identity rule which only applies to one descendant node. The Identity rule identifies a particular music symbol candidate as a meaningful entity in itself.

Figure 8B:
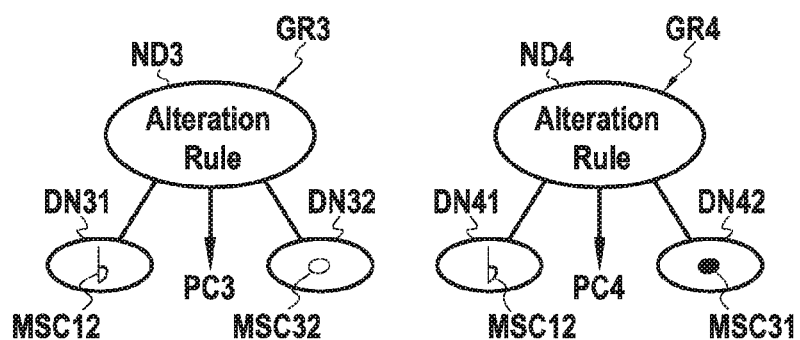

As shown in FIG. 8B, forming unit 36 further generates graph GR3 by applying an "Alteration" rule to MSC12 and MSC32, and generates in the same manner graph GR4 by applying that Alteration rule to MSC12 and MSC31. Graph GR3 is formed by the non-terminal node ND3 corresponding to the Alteration rule applied in this case, and two descendant nodes, which in this case are two terminal nodes corresponding respectively to MSC12 and MSC32. Analogous comments apply to graph GR4 formed by non-terminal node ND4 and the two descendant terminal nodes DN41 and DN42.

In the present example, the Alteration rule is designed to associate an alteration such as a flat to a note. According to a definition of the Alteration rule, the alteration must precede the note to be altered.

Furthermore, associating unit 38 associates (S16) each grammar rule that is applied to at least two descendant nodes with a spatial cost "PC" (e.g., PC3 and PC4 in FIG. 8b) representative of the pertinence of the applied grammar rule based on the spatial relationships between the graphical objects of the at least two descendant nodes, in accordance with the definition of the applied grammar rule.

In this particular example, associating unit 38 determined the spatial cost PC based on at least one of the criteria below:
 the distance between graphical objects;
 the relative horizontal and/or vertical position of graphical objects; and
 Any relevant ink properties that could differentiate between ink segments (e.g., size).
 Any other appropriate criteria may be applied depending on the needs in each particular case.

Among other variations, forming unit 36 and associating unit 38 can be either regarded as two separate functional units, or as one and the same functional unit operable to perform the forming step S14 and the associating step S16. The forming and associating steps S14, S16 can be performed in any order appropriate. For instance, the spatial cost PC may be calculated and assigned as soon as a graph is formed. Alternatively, the spatial costs PC may be calculated at a same later stage for various graphs previously formed.

As can be seen in the example of FIG. 8A, the Identity rule is defined to apply to only one descendant terminal node such that no spatial cost PC is assigned to graphs GR1 and GR2 by associating unit 36.

However, associating unit 38 determines spatial costs PC1 and PC2 and associates (S16) graphs GR3 and GR4 with respectively spatial cost PC3 and PC4 as shown in FIG. 8B.

In a particular embodiment, each grammar rule defines, when applicable:
 a predetermined association of a music symbol or a group of music symbols with at least a non-terminal node, and
 if there are at least two descendant nodes in said association, a value of the spatial cost representative of the pertinence of the grammar rule as a function of spatial relationships of the graphical objects corresponding to the descendant nodes with each other.

Figure 10:
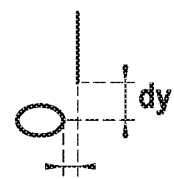
FIG. 10 is a diagram showing an example of the spatial relationships between graphical objects, which may be used to calculate a cost for a grammar rule according to a particular embodiment of the invention.

In a particular embodiment, spatial costs are estimated from distances separating the graphical objects inside a grammar rule. For instance, as shown in FIG. 10, the cost function of a Stem Rule is based on the horizontal gap dx between the stem and the note head, as well as the vertical alignment difference dy between the bottom of the stem and the middle of the note head. In this case, the spatial cost PC is calculated based on the following expression:

$$\text{Cost\_stemRule} = f(dx) + f(dy)$$

Figure 8C:
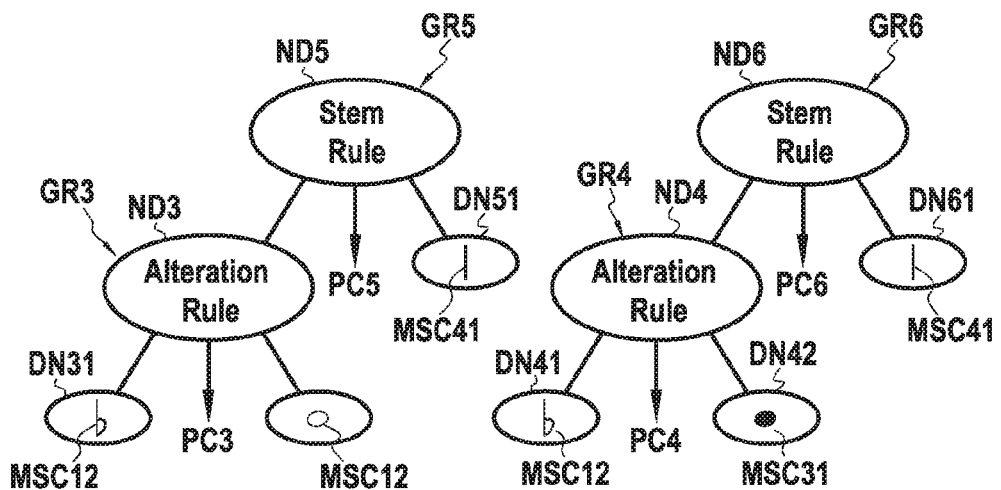

As shown in FIG. 8C, forming unit 36 also forms (S14) graphs GR5 and GR6. Graph GR5 is formed by applying a "Stem" rule to two descendant nodes, that is:
 the non-terminal node ND3 of graph GR3 corresponding to the Alteration rule applied to MSC12 and MSC32; and
 the terminal node DN51 corresponding to music symbol candidate MSC41.

In other words, the Stem rule in graph GR5 is applied to the result of Alteration rule applied in graph GR3 and to MSC41. In the present case, the Stem rule is defined to associate a note head with a stem to identify the association thereof as a note.

Additionally, associating unit 38 associates (S16) a spatial cost PC5 with the Stem rule (non-terminal node ND5) of graph GR5.

Graph GR6 is formed in an analogous manner by applying the Stem rule to the non-terminal node ND4 of graph GR4 and to the descendant terminal node DN61 corresponding to MSC41. A spatial cost PC6 is assigned (S16) by associating unit 38 to the Stem rule of non-terminal node ND6 in graph GR6.

As can be understood from the above examples, the forming unit 36 is operable to construct various graphs from the music symbol candidates to make the most pertinent associations therebetween in accordance with the available set GR of grammar rules.

Figure 8D:
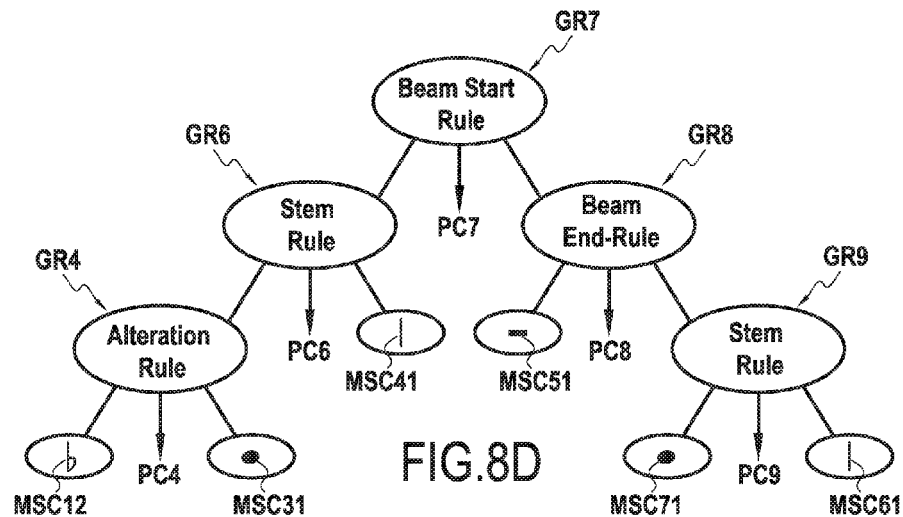

As shown in FIG. 8D, the forming unit 36 forms (S14) in the present example a graph GR7 by applying a "Beam Start" rule to graph GR6 and to the non-terminal node of a graph GR8. Graph GR8 is formed by applying a "Beam End" rule to MSC51 and to the non-terminal node of a graph GR9. Graph GR9 is formed by applying a Stem rule to MSC71 and to MSC61 so as to identify a node composed of a filled-in note head and a stem facing up. As can be understood, the Beam Start rule and Beam End rule of graph GR8 recognise MSC51 as a beam connecting two notes.

A respective spatial cost PC7, PC8 and PC9 is assigned (S16) as appropriate by associating unit 38 to each of graphs GR7, GR8 and GR9.

Figure 8E:
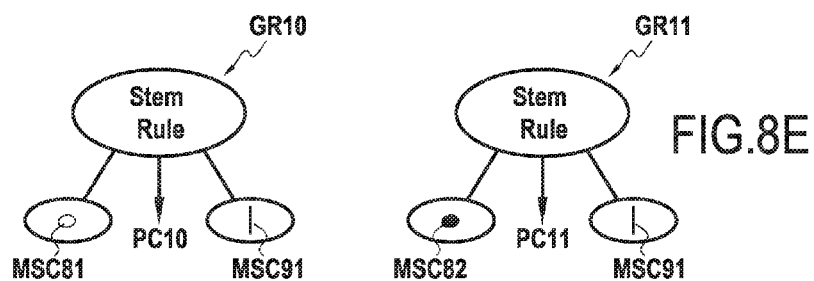

Still further, as shown in FIG. 8E, forming unit 36 forms graph GR10 by applying a Stem rule to MSC81 and MSC91 and forms graph GR11 by applying a Stem rule to MSC82 and MSC91. Spatial costs PC10 and PC11 are respectively associated (S16) with graphs GR10 and GR11 (e.g., with the corresponding grammar rule) by associating unit 38.

In step S18, the selecting unit 40 selects (S18) at least one graph formed by the forming unit 36 as the graph that is the most representative of the handwritten music notations MA based on the symbol costs associated with each music symbol candidate and the spatial costs associated with each applied grammar rule.

Figure 8F:
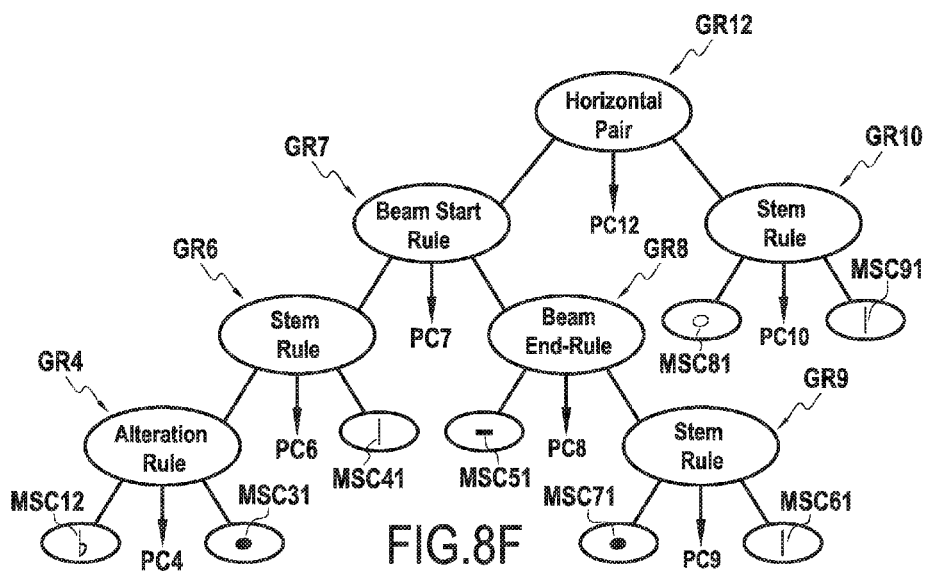
Figure 9:
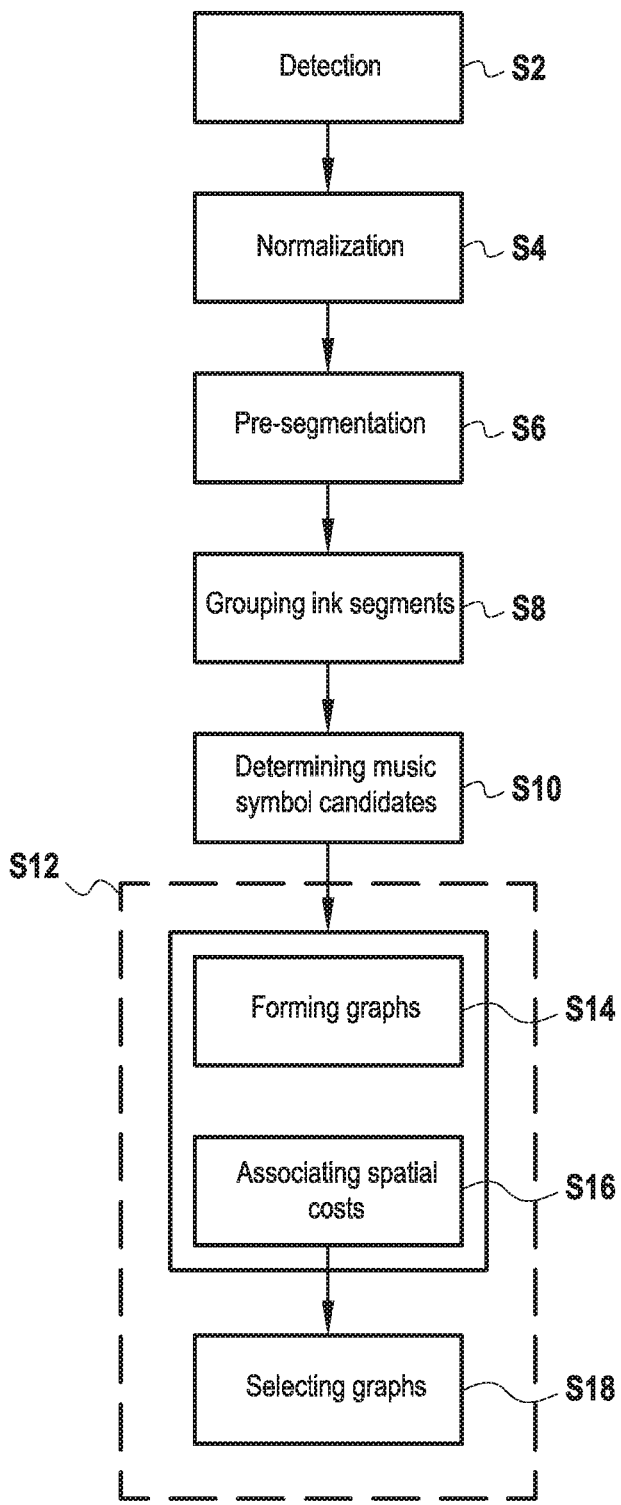
FIG. 9 is a flowchart showing the main steps of a method for recognising music symbols according to a particular embodiment of the invention.

As shown in FIG. 8F, the forming unit 36 forms (S14) in the present example a complete graph GR12 also called a "parse tree" as it represents the entire handwritten music notation MA shown in FIG. 4. Graph GR12 is formed by applying a "Horizontal Pair" rule to graphs GR7 and GR10 mentioned earlier. The non-terminal node formed by the Horizontal Pair rule is associated with a spatial cost PC12 by associating unit 38.

In this example, the selecting unit 40 selects (S18) graph GR12 as the most representative of the handwritten music notation MA. This selection is carried out on the basis of:
the symbol costs SC associated with each music symbol candidate of graph GR12, i.e. SC12, SC31, SC41, SC51, SC71, SC61, SC81 and SC91; and
the spatial costs PC associated with each grammar rule applied to form graph GR12, i.e. PC4, PC6 to PC10 and PC12.

Even though it is preferable in some embodiments, it is not obligatory to generate the final parse tree for the selecting unit 40 to select the most appropriate graphs. Selecting unit 40 may select a plurality of smaller graphs which in combination represent the symbolic version of the handwritten music notations MA.

Some embodiments of the present invention are advantageous in that they take into account the symbol costs and the spatial costs to select the most pertinent graphs, thus finding the best symbolic representation for handwritten music notations. Because of the complementarity of the symbol costs, on the one hand, and the spatial costs, on the other hand, the selecting unit 40 detects the combination of graphs that are the most pertinent to the handwritten music notations at hand (e.g., MA from FIG. 4).

In a particular embodiment, selecting unit 40 calculates for each graph formed by forming unit 36 (or possibly, for each graph retained by forming unit 36 when pruning is performed as explained earlier), a total cost TC which takes into account each symbol cost SC assigned to the music symbol candidates MSC of these graphs and each spatial cost PC (if any) associated with the grammar rules applied in the graphs.

In some embodiments, the selecting unit 40 selects (S18) the most representative graph based on the total costs TC obtained for each graph.

In a particular embodiment, the total cost TC for each graph is obtained by summing at least each spatial cost PC and symbol cost SC of the graph. For instance, total cost TC12 of graph GR12 can be calculated as follows:

$$TC12 = TSC12 + TPC12$$

where TSC12 (total symbol cost for GR12) and TPC12 (total spatial cost for GR12) are such that:

$$TSC12 = SC12 + SC31 + SC41 + SC51 + SC61 + SC71 + SC81 + SC91; \text{ and}$$

$$TPC12 = PC4 + PC6 + PC7 + PC8 + PC9 + PC10 + PC12.$$

In the above example, the total cost is calculated by summing each symbol cost and spatial cost without applying any weighting (i.e. all weights equal to 1). In a variant, each cost of this sum can be weighted as appropriate to give more or less importance to each cost in the calculation of total cost TC12. The weight coefficients can be adapted by the user or programmer to optimize the recognition system for each situation.

In a particular embodiment, selecting unit 40 determines each possible graph representing the detected handwritten music notations and chooses the one or more graph(s) having the lowest total cost(s). Returning to the above example, graph GR12 is selected by selecting unit 40 according to this particular embodiment because it has the lowest total cost TC12 in comparison with the total costs of the other formed (or retained) graphs.

Some embodiments further include displaying by the terminal 2 the one or more symbol candidates included in the graphs selected by selecting unit 40. The result of this selection is for instance displayed in the appropriate order by terminal 2 on the output unit 18B shown in FIG. 2 (e.g. on the touch screen 4 shown in FIG. 1).

Various ways of displaying the selected graphs can be contemplated for embodiments of the present invention. In a particular implementation, each symbol candidate that is displayed replaces the corresponding graphical object present on the display. As a result, the user can see, at the location where was previously drawn a given handwritten music notation, the corresponding music symbol recognised by the terminal 2.

In various embodiments, the music symbol recognition apparatus has the capability and is configured to display the selected music symbol candidates in real-time (or nearly in real-time) to provide the user with instantaneous conversion of his handwritten music notations or symbols 8 into appropriate standardized music symbols.

The selected music symbols may be displayed according to predefined setting parameters (e.g., font size, color, etc.).

In a particular embodiment, the selecting unit 40 also uses a statistical language model to select the most appropriate graphs. A language model allows determining the probability of a music symbol sequence based on prior statistical knowledge. This language model can for instance be constructed based on user input history and/or a set of rules defining language associations which are allowed or banned according to estimates developed on large databases of music scores. In a particular embodiment, the selection unit 40 calculates a language cost LC for one or more grammar rules applied to at least two music symbol candidates. If the language model is used, the selecting unit 40 is configured to take account of each calculated language model LC in addition to the symbol and spatial costs. Using a language model allows further improving efficiency of the music symbol recognition process according to embodiments of the present invention.

Other embodiments of the invention will be apparent to those skilled in the art from consideration of the specification and practice of the invention disclosed herein. It is intended that the specification, drawings, and examples be considered as exemplary only, with a true scope and spirit of the invention being indicated by the following claims.

What is claimed is:

1. A method for recognising music symbols based on handwritten music notations on computing devices, each computing device comprising a processor and at least one non-transitory computer readable medium for recognizing handwriting input under control of the processor, the method comprising:
    segmenting the handwritten music notations into a plurality of ink segments;
    determining at least one music symbol candidate for graphical objects representing groupings of the ink segments based on spatial relationships therebetween, the at least one music symbol candidate having an associated symbol cost;
    forming one or more graphs including the at least one music symbol candidate and one or more grammar rules applied to the at least one music symbol candidate, each grammar rule applied to at least two music symbol candidates having an associated spatial cost based on the spatial relationships between the graphical objects of the at least two music symbol candidates; and
    selecting at least one graph of the one or more graphs as representing the handwritten music notations based on the symbol costs and the spatial costs associated with the one or more graphs.

2. The method according to claim 1, wherein the symbol cost represents the probability of a graphical object belonging to a predetermined class of the at least one music symbol candidate.

3. The method according to claim 1, wherein the at least one music symbol candidate is determined based on graphical features extracted from the graphical objects.

4. The method according to claim 1, wherein the selecting at least one graph comprises:
    determining each possible graph representing the handwritten music notations; and
    choosing a graph having a lowest total cost that is the sum of the associated symbol costs and the associated spatial costs.

5. The method according to claim 1, wherein the forming one or more graphs comprises:
    forming each graph to comprise descendant nodes, each descendant node being either a terminal node corresponding to a music symbol candidate or a non-terminal node corresponding to a grammar rule applied to at least one other descendant node.

6. The method according to claim 5, wherein each grammar rule associated with a spatial cost is applied to at least two descendant nodes, the spatial cost being representative of the pertinence of the associated applied grammar rule based on the spatial relationships between the graphical objects of the at least two descendant nodes.

7. The method according to claim 6, wherein each grammar rule defines, when applicable:
    a predetermined association of a music symbol or a group of music symbols with at least a non-terminal node; and
    a value of the spatial cost based on the spatial relationships of the graphical objects corresponding to the at least two descendant nodes, when there are at least two descendant nodes in the predetermined association.

8. A non-transitory computer readable medium having a computer readable program code embodied therein, the computer readable program code adapted to be executed to implement a method for recognising music symbols based on handwritten music notations on a computing device, the computing device comprising a processor and at least one system non-transitory computer readable medium for recognizing handwriting input under control of the processor, the method comprising:
    segmenting the handwritten music notations into a plurality of ink segments;
    determining at least one music symbol candidate for graphical objects representing groupings of the ink segments based on spatial relationships therebetween, the at least one music symbol candidate having an associated symbol cost;
    forming one or more graphs including the at least one music symbol candidate and one or more grammar rules applied to the at least one music symbol candidate, each grammar rule applied to at least two music symbol candidates having an associated spatial cost based on the spatial relationships between the graphical objects of the at least two music symbol candidates; and
    selecting at least one graph of the one or more graphs as representing the handwritten music notations based on the symbol costs and the spatial costs associated with the one or more graphs.

9. The non-transitory computer readable medium according to claim 8, wherein the symbol cost represents the probability of the graphical object belonging to a predetermined class of the at least one music symbol candidate.

10. The non-transitory computer readable medium according to claim 8, wherein the at least one music symbol candidate is determined based on graphical features extracted from the graphical objects.

11. The non-transitory computer readable medium according to claim 8, wherein the selecting at least one graph comprises:
    determining each possible graph representing the handwritten music notations; and
    choosing the graph having the lowest total cost being the sum of the associated symbol costs and the associated spatial costs.

12. The non-transitory computer readable medium according to claim 8, wherein the forming one or more graphs comprises:
    forming each graph to comprise descendant nodes, each descendant node being either a terminal node corresponding to a music symbol candidate or a non-terminal node corresponding to a grammar rule applied to at least one other descendant node.

13. The non-transitory computer readable medium according to claim 12, wherein each grammar rule associated with a spatial cost is applied to at least two descendant nodes, the spatial cost being representative of the pertinence of the associated applied grammar rule based on the spatial relationships between the graphical objects of the at least two descendant nodes.

14. The non-transitory computer readable medium according to claim 13, wherein each grammar rule defines, when applicable:
   a predetermined association of a music symbol or a group of music symbols with at least a non-terminal node; and
   a value of the spatial cost based on the spatial relationships of the graphical objects corresponding to the at least two descendant nodes, when there are at least two descendant nodes in the predetermined association.

15. A system for recognising music symbols based on handwritten music notations on computing devices, each computing device comprising a processor and at least one non-transitory computer readable medium for recognizing handwriting input under control of the processor, the system configured to:
   segment the handwritten music notations into a plurality of ink segments;
   determine at least one music symbol candidate for graphical objects representing groupings of the ink segments based on spatial relationships therebetween, the at least one music symbol candidate having an associated symbol cost;
   form one or more graphs including the at least one music symbol candidate and one or more grammar rules applied to the at least one music symbol candidate, each grammar rule applied to at least two music symbol candidates having an associated spatial cost based on the spatial relationships between the graphical objects of the at least two music symbol candidates; and
   select at least one graph of the one or more graphs as representing the handwritten music notations based on the symbol costs and the spatial costs associated with the one or more graphs.

16. The system according to claim 15, wherein the symbol cost represents the probability of the graphical object belonging to a predetermined class of the at least one music symbol candidate.

17. The system according to claim 15, wherein the at least one music symbol candidate is determined based on graphical features extracted from the graphical objects.

18. The system according to claim 15, wherein when selecting at least one graph, the system is further configured to: determine each possible graph representing the handwritten music notations; and
   choose the graph having the lowest total cost being the sum of the associated symbol costs and the associated spatial costs.

19. The system according to claim 15, wherein when forming one or more graphs, the system is further configured to:
   form each graph to comprise descendant nodes, each descendant node being either a terminal node corresponding to a music symbol candidate or a non-terminal node corresponding to a grammar rule applied to at least one other descendant node.

20. The system according to claim 19, wherein each grammar rule associated with a spatial cost is applied to at least two descendant nodes, the spatial cost being representative of the pertinence of the associated applied grammar rule based on the spatial relationships between the graphical objects of the at least two descendant nodes.

21. The system according to claim 20, wherein each grammar rule defines, when applicable:
   a predetermined association of a music symbol or a group of music symbols with at least a non-terminal node; and
   a value of the spatial cost based on the spatial relationships of the graphical objects corresponding to the at least two descendant nodes, when there are at least two descendant nodes in the predetermined association.

* * * * *